US012786695B2

(12) United States Patent
Oguma

(10) Patent No.: US 12,786,695 B2
(45) Date of Patent: Nov. 3, 2026

(54) APPARATUS, METHOD, AND STORAGE MEDIUM FOR DATA PROCESSING

(71) Applicant: SORACOM, INC, Tokyo (JP)

(72) Inventor: Takashi Oguma, Tokyo (JP)

(73) Assignee: SORACOM, INC, Tokyo (JP)

( * ) Notice: Subject to any disclaimer, the term of this patent is extended or adjusted under 35 U.S.C. 154(b) by 374 days.

(21) Appl. No.: 18/089,673

(22) Filed: Dec. 28, 2022

(65) Prior Publication Data

US 2023/0134749 A1 May 4, 2023

Related U.S. Application Data

(63) Continuation of application No. PCT/JP2021/026234, filed on Jul. 13, 2021.

(30) Foreign Application Priority Data

Jul. 13, 2020 (JP) ................................ 2020-119942

(51) Int. Cl.

*H04W 4/60* (2018.01)
*H04W 8/16* (2009.01)
*H04W 8/24* (2009.01)
*H04W 12/062* (2021.01)

(52) U.S. Cl.

CPC .............. *H04W 8/24* (2013.01); *H04W 8/16* (2013.01); *H04W 12/062* (2021.01)

(58) Field of Classification Search

CPC ................................ H04W 4/60; H04W 8/16
See application file for complete search history.

(56) References Cited

U.S. PATENT DOCUMENTS

| | | | |
|---|---|---|---|
| 10,638,354 | B2 | 4/2020 | Nakano et al. |
| 11,310,655 | B2 | 4/2022 | Tamagawa |
| 11,317,316 | B2 | 4/2022 | Nakano et al. |

(Continued)

FOREIGN PATENT DOCUMENTS

| | | | |
|---|---|---|---|
| CN | 109614778 | A | 4/2019 |
| WO | 2016/148001 | A1 | 9/2016 |

(Continued)

OTHER PUBLICATIONS

International Search and Written Opinion for PCT/JP2021/026234 mailed Sep. 28, 2021. (partially translated).

(Continued)

*Primary Examiner* — Barry W Taylor
(74) *Attorney, Agent, or Firm* — THOMAS | HORSTEMEYER, LLP

(57) ABSTRACT

A method of data processing in a node constituting a core network is provided. The core network including a first facility and a second facility configured to be capable of receiving data from an IoT device through communication on a U-plane from the first facility and transmitting the data to an IP network. The method comprises receiving data from the IoT device, determining whether a program associated with a SIM installed in the IoT device is present based on a session identifier included in a header of the data, the session identifier indicating a session on the U-plane, and when the program associated with the SIM is present, executing the program for the data. Processing which is allowed to be executed by the program is restricted.

17 Claims, 5 Drawing Sheets

(56) References Cited

U.S. PATENT DOCUMENTS

| | | | | |
|---|---|---|---|---|
| 2006/0195898 | A1* | 8/2006 | Blicker | H04L 63/08 726/12 |
| 2013/0007237 | A1* | 1/2013 | Mehta | H04W 8/082 709/223 |
| 2014/0321278 | A1* | 10/2014 | Cafarelli | H04L 43/12 370/235 |
| 2016/0119870 | A1* | 4/2016 | Chang | H04W 12/03 455/552.1 |
| 2017/0230832 | A1 | 8/2017 | Ophir et al. | |
| 2017/0347283 | A1* | 11/2017 | Kodaypak | H04W 24/08 |
| 2017/0366969 | A1* | 12/2017 | Syed | H04W 12/068 |
| 2018/0070262 | A1 | 3/2018 | Nakano et al. | |
| 2018/0097657 | A1* | 4/2018 | Dao | H04L 41/0806 |
| 2018/0184281 | A1 | 6/2018 | Tamagawa | |
| 2019/0110324 | A1* | 4/2019 | Xu | H04L 12/4633 |
| 2019/0364492 | A1* | 11/2019 | Azizi | H04W 52/0264 |
| 2020/0084633 | A1* | 3/2020 | Soliman | H04W 12/068 |
| 2020/0229025 | A1 | 7/2020 | Nakano et al. | |
| 2020/0267521 | A1* | 8/2020 | Bruner | H04L 9/3247 |
| 2022/0217576 | A1 | 7/2022 | Nakano et al. | |
| 2022/0279339 | A1 | 9/2022 | Tamagawa | |
| 2022/0353336 | A1* | 11/2022 | Cañete Martinez | H04W 76/10 |
| 2025/0330421 | A1* | 10/2025 | Kapela | F24S 25/33 |

FOREIGN PATENT DOCUMENTS

| | | | |
|---|---|---|---|
| WO | 2016/199873 | A1 | 12/2016 |
| WO | 2022/014561 | A1 | 1/2022 |

OTHER PUBLICATIONS

Japanese Office Action for Japanese Patent Application No. 2020-119942 dated Jun. 17, 2024 (partially translated).

Chinese Office Action for Chinese Patent Application No. 202180049761.4 dated Mar. 2, 2026.

* cited by examiner

APPARATUS, METHOD, AND STORAGE MEDIUM FOR DATA PROCESSING

CROSS-REFERENCE TO RELATED APPLICATION(S)

This application is a continuation of International Patent Application No. PCT/JP2021/26234 filed on Jul. 13, 2021, which claims priority to and the benefit of Japanese Patent Application No. 2020-119942 filed on Jul. 13, 2020, the entire disclosures of which are incorporated herein by reference.

BACKGROUND OF THE INVENTION

Field of the Invention

The present disclosure relates to an apparatus, a method, and a storage medium for data processing, and particularly to an apparatus, a method, and a storage medium for data processing in a core network.

Description of the Related Art

The number of devices connected to computer networks such as the Internet is increasing, and the concept of the Internet of Things, in which all things are networked, is becoming widespread. Wireless communication services for networking devices have conventionally been provided directly to end users by mobile network operators (MNOs) that own the wireless communication infrastructure, but in recent years, businesses called mobile virtual network operators (MVNOs) have been using MNOs' wireless communication infrastructure to provide their own wireless communication services to end users. In some cases, a mobile virtual network enabler (MVNE) operates between the MNO and the MVNO to provide support services for the MVNO to operate smoothly. The MVNE receives SIMs from the MNO and then provides the SIMs to the MVNO.

MVNEs or MVNOs that provide wireless communication services for networked devices (called "IoT devices" hereinafter) may have their own communication infrastructure for providing access to computer networks such as Internet Protocol (IP) networks. This is used to set communication quality, such as communication rate, communication capacity, and the like, according to prices, in an attempt to meet a variety of needs.

In order to utilize data collected from IoT devices using such services, it has been necessary for a user to build their own system on an IP network or select an existing service to perform data processing such as analysis on a server on the IP network.

However, building a new system is a heavy burden. In addition, in order to use various existing services such as SaaS, it is necessary for the format of data transmitted from an IoT device to match the format of that service. However, in many cases the format does not match, which eventually makes a system for format conversion processing necessary.

SUMMARY OF THE INVENTION

An aspect of the present invention makes it possible to perform data processing on data transmitted from the IoT device before exiting to the IP network. In an embodiment, a method of data processing in a node constituting a core network is provided. The core network including a first facility and a second facility configured to be capable of receiving data from an IoT device through communication on a U-plane from the first facility and transmitting the data to an IP network. The method comprises receiving, by the node, data from the IoT device, determining, by the node, whether a program associated with a SIM installed in the IoT device is present based on a session identifier included in a header of the data, the session identifier indicating a session on the U-plane, and when the program associated with the SIM is present, executing, by the node, the program for the data. Processing which is allowed to be executed by the program is restricted.

Further features of the present invention will become apparent from the following description of exemplary embodiments with reference to the attached drawings.

DESCRIPTION OF THE EMBODIMENTS

Embodiments of the present invention will be described in detail hereinafter with reference to the drawings.

First Embodiment

Figure 1:
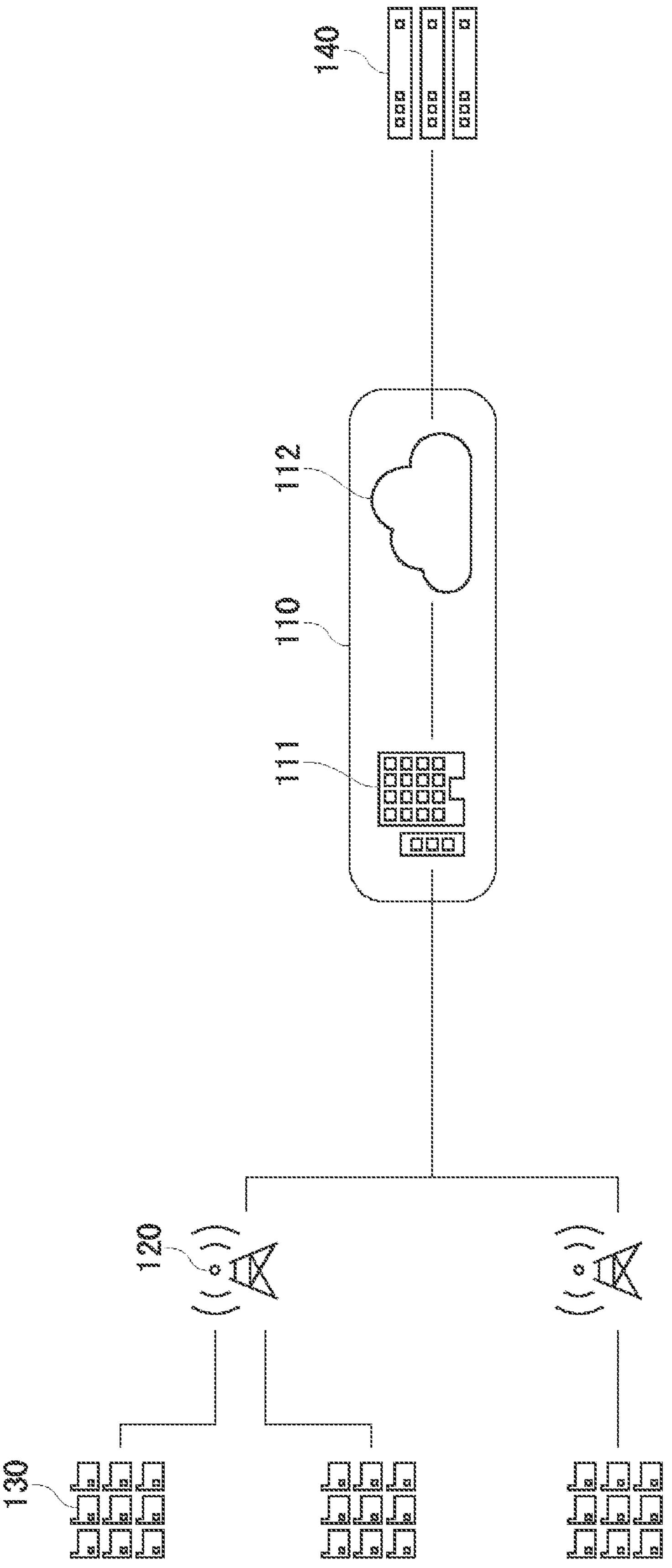
FIG. 1 is a diagram illustrating a communication system according to a first embodiment of the present invention.

FIG. 1 illustrates a communication system according to a first embodiment of the present invention. The communication system 110 includes an MNO facility 111 that communicates with a base station 120, and a cloud facility 112 configured to be capable of receiving, from the MNO facility 111, data from IoT devices 130 and transmit the data to an external server 140 via an IP network. Although FIG. 1 illustrates two base stations, one will be used as an example. FIG. 1 also illustrates a number of IoT devices 130 by Subscriber Identity Modules (SIMS) installed therein, but one of these will be used as an example.

In the present specification, "MNO facility" means a facility for communication owned by an MNO, and "cloud facility" means a facility in the cloud. Here, "cloud" refers to a system that can dynamically provision and provide computing resources such as CPU, memory, storage, network bandwidth, and the like on demand over a network. The cloud can be used through AWS (registered trademark) or the like, for example. In addition, "public cloud" refers to a cloud that can be used by a plurality of tenants. The cloud facility 112 is a node of the MVNE or MVNO, and is preferably an instance on a public cloud.

Here, the communication system according to the present embodiment is for communication on the U-plane, and in 4G, SGW corresponds to a first facility 111 and PGW corresponds to a second facility 112. There are discussions that in 5G, functions on the C-plane are separated from functions on the U-plane, and functions on the U-plane are aggregated in nodes called UPFs, and the boundary between functions handled by the MNO facility 111 and functions handled by the cloud facility 112 is not absolutely defined. However, this point does not affect the descriptions of the features of the present invention. The entirety of the functions handled by the MNO facility 111 and the cloud facility 112 are sometimes called a "core network". In 4G, eNodeB corresponds to the base station 120, and in 5G, gNodeB corresponds to the base station 120.

While the cloud facility 112 can transmit data from the IoT device 130 to an external server 140 outside the core network via an IP network, as described below, in the present embodiment, if that data is associated with a predetermined SIM, a pre-specified program is executed to make changes to the payload of that data.

As used in the present specification, a "SIM" can be a physical SIM card, but can also be a semiconductor chip embedded in the IoT device 130 (also called an "eSIM"). It is also possible to install software in a secure area within a module of the IoT device 130 and store an identifier such as International Mobile Subscriber Identity (IMSI) on the software, and various other forms are conceivable as well.

Figure 2:
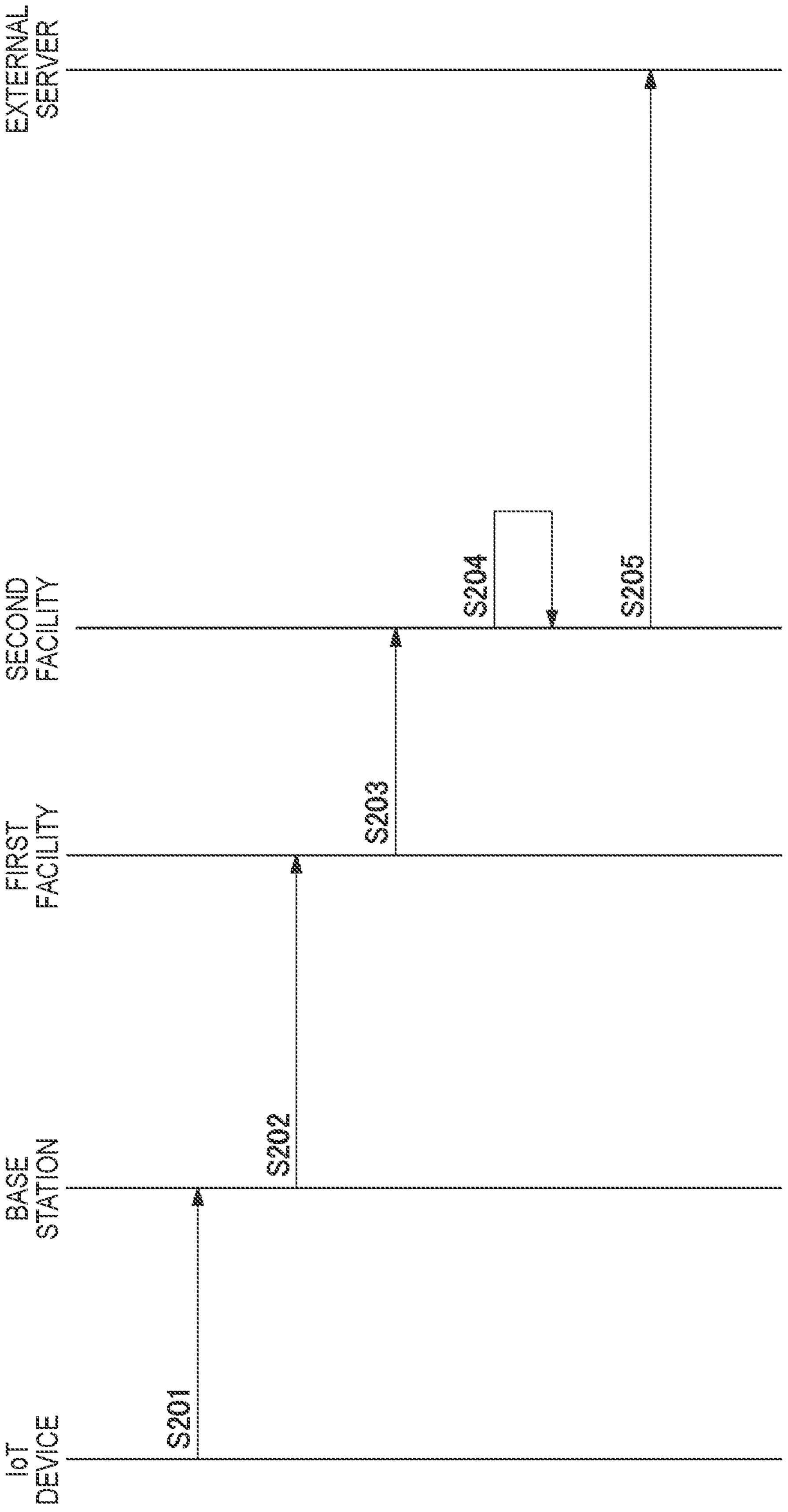
FIG. 2 is a sequence chart according to the first embodiment of the present invention.

FIG. 2 is a sequence chart according to a first embodiment of the present invention. First, the IoT device 130 transmits data given the required header in the payload to the base station 120 (S201). In one example, the payload of that data is given a UDP header, an IP header, and a radio header. Image data in a predetermined format, compressed binary data, and the like can be given as examples of payloads, which will be further described below.

The base station 120 removes the radio header from the received data and, in the case of 4G, adds a GTP-U header and transmits the resulting data to the MNO facility 111 (S202). The MNO facility 111 forwards the received data to the cloud facility 112 (S203).

Then, based on a Tunneling Endpoint ID (TEID) included in the header of the received data, the cloud facility 112 determines whether the data is associated with a predetermined SIM, and if so, executes the pre-specified program for the payload of the data (S204).

Specifically, when a session is generated by communication on the C-plane, a TEID representing each session is also generated, and an association between the TEID and the SIM used for communication on the U-plane (also called a "first association" hereinafter) is stored in the cloud facility 112 or in a storage device or a storage medium accessible by the cloud facility 112. Furthermore, for the SIM used for communication on the U-plane, an association as to whether or not a program pre-specified by a user (also called "user code" hereinafter) is to be executed (also called a "second association" hereinafter, and if the user code is to be executed, the second association may include a specification as to which user code is to be executed) is stored in the cloud facility 112 or a storage device or a storage medium accessible by the cloud facility 112. Based on the TEID included in the header of the data received by the cloud facility 112, the first and second associations are referenced and the program is executed for that payload as necessary. Although the first and second associations are described here as being separate, these may be integrated as a single association, as long as it is possible to identify the user code to be executed based on the TEID in some way. Additionally, although the TEID is used as an identifier for identifying the SIM in the present specification, it is conceivable that an identifier aside from the TEID could be used as long as the SIM and the user code associated with the SIM can be identified.

The cloud facility 112 then adds the required header to the converted payload and transmits the payload to an application server 140 on the IP network (S205). In this case, as an example, the transport layer protocol can be converted from TCP to UDP or from UDP to TCP in addition to the payload conversion. It is also possible to convert the application layer protocol, such as from HTTP to HTTPS, as an example. Although the foregoing descriptions do not explicitly state whether the user code deletes and adds headers, at least one of the deletion or addition of headers may also be performed through the execution of the user code, in addition to changing the payload. Instructions for another program to add headers may be written in the user code, and protocol conversion may be performed by the other program on the payload after the processing for changing performed by the user code.

Although further details will be given later, the user code is restricted in terms of the data that can be input in the user code and the processing that can be executed by the user code. Accordingly, even if user code that a user freely creates can be executed in the cloud facility 112, the risk in terms of safety is suppressed.

As described above, by imposing a certain constraint on the user code that can be executed in the cloud facility 112 such as a PGW, it is possible to allow user code to be executed in the core network 110 before exiting to the IP network and remove the burden of building a new system on the IP network from a user who wishes to utilize data collected from IoT devices.

Note that unless "only" is written, such as "based on xx only", "according to xx only", or "in the case of xx only", the present specification assumes that additional information can also be taken into account. Additionally, as an example, it should be noted that the statement "perform b in the case of a" does not necessarily mean "always perform b in the case of a" or "perform b immediately after a", unless explicitly stated. Additionally, the statement "each a constituting A" does not necessarily mean that A is constituted by a plurality of constituent elements, but includes a situation where the constituent element is singular.

Additionally, it should be added that, even when not explicitly mentioned in the present specification, the data that can be input in the user code and the processing that can be executed by the user code are assumed to be restricted to some of the data and processing described in the present specification herein as an aspect of the present invention.

Additionally, to be clear, even if there are aspects of some method, program, terminal, apparatus, server, or system ("method and the like" hereinafter) that perform operations different from those described in the present specification, each aspect of the present invention applies to the same operations as any of the operations described in the present specification, and the existence of operations different from the operations described in the present specification does not mean that the method and the like fall outside the scope of each aspect of the present invention.

Although the foregoing descriptions mention the user code as being executed in the cloud facility 112, the user code may be executed in conjunction with one or more of processes defined for any of the nodes in the core network 110. Specifically, before forwarding data received from the base station 120 in the MNO facility 111 such as an SGW, the user code can be executed as necessary based on the header of that data. Additionally, although the nodes constituting the core network in communication on the U-plane are SGWs and PGWs in the case of 4G, it is also conceivable to provide other network facilities such as routers, proxy servers, and load balancers. The user code can then be executed on these network facilities. It is necessary for the node which executes the user code to have direct or indirect access to the association between the TEID and the user code which can be executed, and to the data that can be input to the user code.

In the present specification, the facility referred to as an SGW is called an "MNO facility" and the facility referred to as a PGW is called a "cloud facility" in 4G, but more generally, the former may be referred to as a "first facility" and the latter as a "second facility". In this case, the "first facility" may be any facility that fulfills a role equivalent to that of the aforementioned "MNO facility", even if it is a facility owned by a business that does not necessarily correspond to an MNO.

Details of User Code

The user code executed by the cloud facility 112 can be specified by being uploaded by the user of the communication service provided by the cloud facility 112. The user code is uploaded from a user terminal 320 directly to the cloud facility 112, or through an intermediate server 310 capable of communicating with the cloud facility 112. The user code can be a program in a predetermined binary format or text format, with WebAssembly being an example of the binary format, and a script format such as Python or Javascript (registered trademark) being an example of the text format.

The cloud facility 112 includes a communication unit 112-1 such as a communication interface, a processing unit 112-2 such as a processor or a CPU, and a storage unit 112-3 including a storage device or a storage medium such as a memory or a hard disk, and can be configured by executing programs for performing various processing. The cloud facility 112 may include one or more apparatuses, computers, or servers. The program may also include one or more programs, and can be recorded into a computer-readable storage medium as a non-transitory program product. The program can be stored in the storage unit 112-3, or in a storage medium 112-4 which can be accessed by the cloud facility 112, and can be executed by the processing unit 112-2. The uploaded user code, too, is stored in the storage unit 112-3 of the cloud facility 112, or in the storage medium 112-4, which can be accessed by the cloud facility 112 over a computer network. Although not illustrated, the MNO facility 111 can have a similar configuration.

Figure 3:
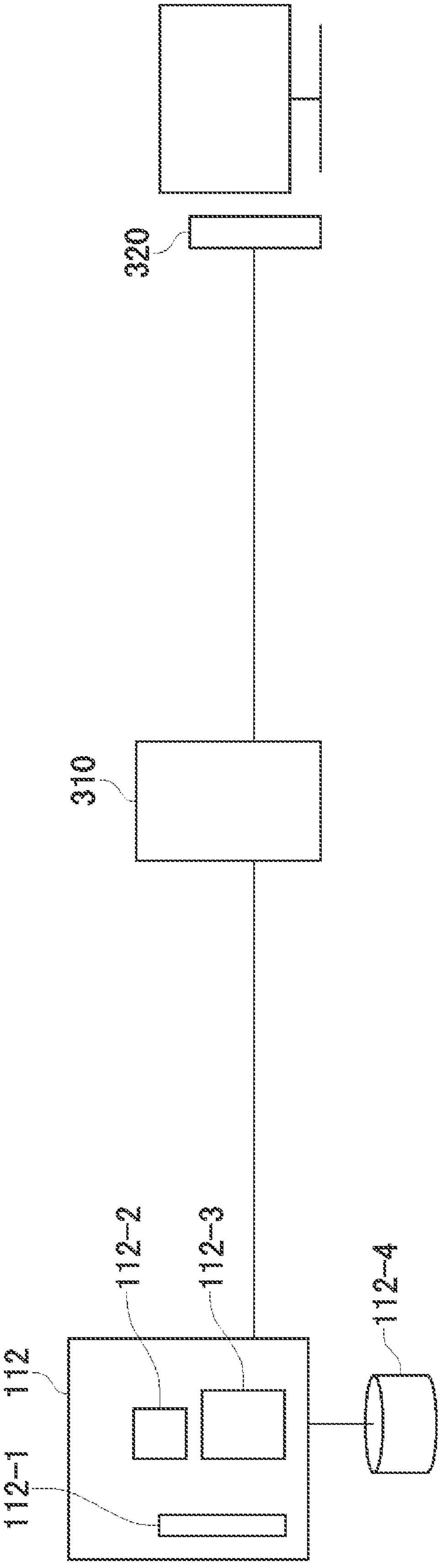
FIG. 3 is a diagram illustrating an example of a cloud facility according to the first embodiment of the present invention.
Figure 4:
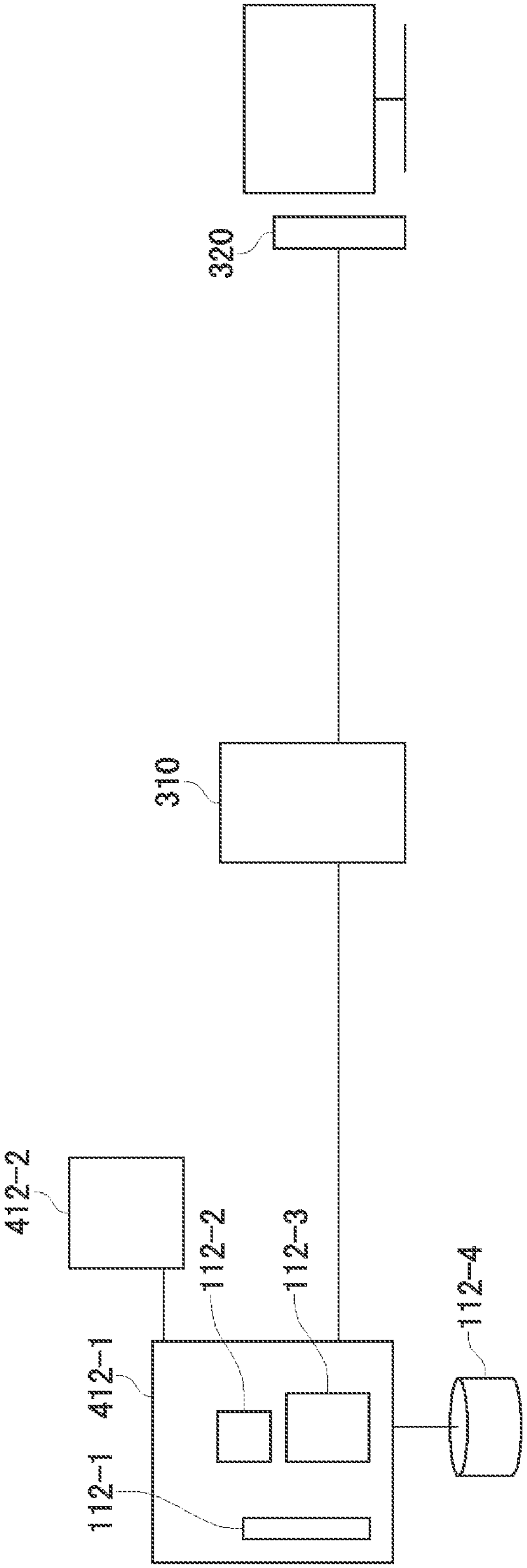
FIG. 4 is a diagram illustrating another example of a cloud facility according to the first embodiment of the present invention.

In FIG. 3, the user code is assumed to be stored and executed using the computing resources of the cloud facility 112. However, as illustrated in FIG. 4, in the cloud facility 112, a server or an instance 412-2 (corresponding to a "second instance") can be prepared separate from a server or an instance 412-1 (corresponding to a "first instance") for executing the communication processing of receiving, from the MNO facility 111, the data from the IoT devices 130 and transmitting that data to the IP network. This is preferable because the safety can be further improved, as will be described later. When user code is executed in an instance separate from the instance for executing communication processing, that separate instance may also be referred to as the cloud facility 112, or may be referred to as an instance disposed outside the cloud facility 112. However, in the present specification, that separate instance will also be referred to as a "cloud facility".

The user code can be associated with one or more SIMs when uploaded by the user. The cloud facility 112 can identify the user code to be executed with reference to the association by determining the SIM used for communication on the U-plane based on the GTP-U header, in the case of 4G. The association between the SIM and the user code may be a direct association, or an indirect association made by setting a group to which each SIM belongs and then associating the group with the user code. In this case, the user code to be run can be changed on a group-by-group basis. It is also conceivable to make an indirect association by associating the IoT device in which the SIM is installed with the user code.

At least one of the data which can be input to the user code or the processing which can be executed by the user code is restricted in the cloud facility 112. In the present embodiment, the data which can be used in the user code is preferably restricted to the data received by the cloud facility 112 and predetermined metadata. In the present embodiment, the processing which can be executed by the user code is preferably restricted to processing which can be executed in memory having a predetermined upper limit size, within a predetermined CPU time. Additionally, it is preferable to determine in advance, and restrict, the Application Programming Interfaces (APIs) which can be called within the user code.

The "predetermined metadata" includes data tied to or associated with each SIM, and examples thereof are information, set by the user for a SIM, which identifies the SIM used in communication on the U-plane based on the TEID included in the header of data received by the cloud facility 112 through that communication; information set by the user for the group to which that SIM belongs; and the like. More specifically, the IMSI of the SIM, the name of the SIM, the name of the group, the IP address of the sender, and the like can be given as examples.

The metadata includes data tied to or associated with each session, examples of which are information held by the cloud facility 112 for the session identified by the TEID included in the header, time information added by the cloud facility 112 when the data is received, and the like. The cloud facility 112 can, for example, hold an identifier of the base station 120 to which the IoT device 130 is connected, or alternatively, may estimate location information of the IoT device 130 from that identifier and store the location information as metadata in the storage unit 112-3 of the cloud facility 112, a storage device accessible from the cloud facility 112, or the storage medium 112-4.

For example, limiting the CPU time to within a predetermined number of seconds, such as 1, 2, or 3 seconds, and limiting the upper limit size of the memory to a predetermined number of MB, such as 32 MB, 128 MB, or the like, can be given as restrictions on the computing resources which can be used by the user code. The user code is permitted to execute various types of arithmetic processing using computing resources such as the CPU, memory, and the like of the cloud facility 112 within a predetermined range. Examples of the arithmetic processing include four arithmetic operations, arithmetic functions, conditional judgments using if statements and the like, and repetitions using for statements and the like.

An API for leaving an operation log of the user code, an API for storing at least part of the payload, and API for retrieving stored data, an API for changing the transmission destination of the payload, and the like can be given as examples of predetermined APIs that can be called within the user code. Placing restrictions on the APIs that can be called in this manner, or more generally, on the instructions to other programs that can be written in the user code makes it possible to suppress attempts to directly access the OS constituting the execution environment of the user code or middleware on the OS to view files, access an IP network such as the Internet to transmit data to an unauthorized server, and so on without permissions being given.

The second facility 112 can determine whether the user code can be executed by referring to the association of the APIs that can be called in the user code with each SIM. More specifically, the second facility 112 determines, for each API declared for import in the user code, whether the SIM with which the user code is associated has permission for calling that API, and if an API which does not have permissions is declared for import, the user code is not executed. User code enables various processing by calling APIs provided by the OS of the cloud facility 112 or middleware on the OS, and in the present embodiment, APIs that do not have permissions cannot be called. It is therefore unlikely that the functions of the cloud facility 112 will be interfered with even if users can freely write user code.

Additionally, if an instance responsible for communication processing and an instance responsible for conversion processing for payloads are separated, the user code is executed in the latter instance, which makes it possible to further suppress the possibility of the API provided by the OS of the instance responsible for communication processing or middleware on that OS unexpectedly being called and interfering with the communication processing functions of the cloud facility 112. This separation also makes it possible to suppress the possibility of user code unexpectedly using the computing resources of the instance responsible for communication processing and interfering with the communication processing functions of the cloud facility 112. In other words, there is an advantage in not performing the communication processing for transmitting data to the IP network in the instance that performs the conversion processing for payloads.

Example of User Code

The following is an example of processing by user code which is possible for a payload.

If the IoT device 130 is provided with a button, a payload indicating that the button has been pressed can be processed into meaningful information. As an example, "single press", "double press", and "long press" can be assigned the meanings of "go to work", "leave work", and "break", respectively, and can be received by the external server 140 on the IP network.

In addition, when the IoT device 130 is provided with a temperature sensor and a humidity sensor, meaningful information, including temperature data and humidity data obtained from the respective sensors, can be added to the payload. As an example, a discomfort index determined by temperature and humidity can be calculated and added, metadata tied to the SIM installed in the IoT device 130 can be read out and any of the data contained therein can be added, or the like. The user may register the name of the SIM, the name of the person responsible for managing the SIM, and the like as the metadata for the SIM. The user can also set a temperature threshold as metadata and add a flag to the temperature data if the temperature represented by the temperature data in the payload exceeds that threshold.

Conversely, outliers, invalid values, and the like can be excluded from the payload. This makes it possible to reduce the processing in the external server 140.

Data transmitted in a compressed format from the IoT device 130 can also be decompressed. This can reduce the amount of data communication by the IoT device 130.

When the payload received from the IoT device 130 contains data having units such as seconds, temperature, and the like, the units can also be converted. This enables the user code to absorb differences in data formats arising from the specifications of each IoT device and communicate those differences to the external server 140. Conversely, if a plurality of SaaS services are present as linked destinations, the data contained in the payload can be converted for each linked destination.

Binary data transmitted from the IoT device 130 in any proprietary format can also be converted to JSON format. The user code enables parsing of data in a format having complex conditional branching, which can be converted to a format that can be interpreted by the external server 140, such as the JSON format, before being transmitted to the external server 140.

The location information of the IoT device 130 can be obtained using metadata associated with the SIM installed in the IoT device 130, and the payload can be transmitted to the external server 140 on the condition that the device has moved to a specific location or range. If necessary, an API that changes the transmission destination of the payload is called in the user code. In order to transmit the payload to the external server 140 only when the conditions described above are satisfied, an API for discarding the payload and not transmitting the payload to the external server 140 is called in the user code when a predetermined condition is not satisfied.

Second Embodiment

In the first embodiment, the descriptions assumed that the user code is executed on the data from the IoT device 130 and is then transmitted outside the core network to the external server 140, but depending on the type of the data transmitted from the IoT device 130, it may be necessary to return a response to the IoT device 130 after executing the user code. In such cases, it is preferable that the user code be executed by a node in the core network 110 that is physically close to the IoT device 130 in order to reduce latency and achieve a fast response.

Figure 5:
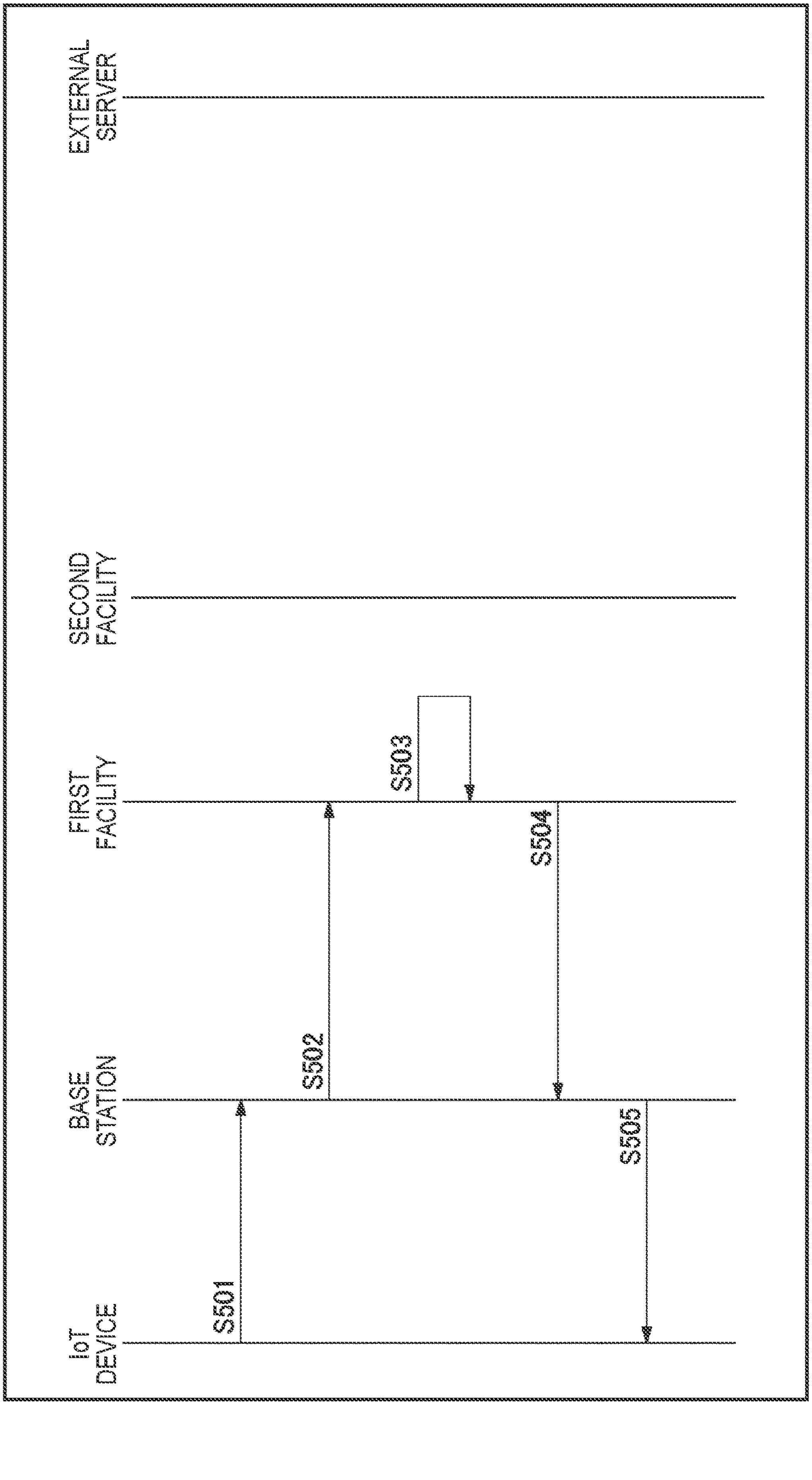
FIG. 5 is a sequence chart according to a second embodiment of the present invention.

FIG. 5 is a sequence chart according to a second embodiment of the present invention. First, the IoT device 130 transmits data including a required header in the payload to the base station 120 (S501). The base station 120 removes the radio header from the received data and, in the case of 4G, adds a GTP-U header and transmits the resulting data to the MNO facility 111 (S502). Then, based on a TEID included in the header of the received data, the MNO facility 111 determines whether the data is associated with a predetermined SIM, and if so, executes the pre-specified program for the payload of the data (S503). The association between the TEID and the user code to be executed, as described in the first embodiment, may be available for reference by the MNO facility 111 as well.

As an example, image data is transmitted from the IoT device 130 as a payload, and the MNO facility 111 responds by performing image processing such as superimposing relatively simple AR images such as arrows, lines, borders, text, decorations, and the like within the range of computing resources permitted for the user code. Additionally, voice data is transmitted from the IoT device 130 as a payload, and the MNO facility 111 responds by performing voice processing such as translation and voice synthesis within the range of computing resources permitted for the user code. Alternatively, it is conceivable to generate data by including required model data in the payload and executing the arithmetic processing described in the user code on the model data. Compared to a case where such data processing is performed by the external server 140 outside the core network, where transmission latency of about 100 msec can occur, this latency can be significantly reduced, and the effect of executing the user code at a node close to the IoT device 130 within the core network 110, and more preferably, at the closest node to the IoT device 130 in the core network 110 in communication on the U-plane, is particularly marked in 5G.

In the present embodiment, after the conversion processing on the payload, the response is returned via the base station 120 (S504) toward the IoT device 130 (S505), and it is therefore necessary for the user code executed in the MNO facility 111 to be given permissions to call an API for transmitting the response from the MNO facility 111 in communication on the U-plane.

Note that all of the variations described in the first embodiment for any node constituting the cloud facility 112 or core network 110 are also applicable to the MNO facility 111.

According to the embodiments described above, by imposing a certain constraint on user code that can be executed in any of nodes constituting a core network, data processing can be performed on data transmitted from an IoT device in a core network 110 before exiting to the IP network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of data processing in a node constituting a core network, the core network including a first facility and a second facility configured to be capable of receiving data from an IoT device through communication on a U-plane from the first facility and transmitting the data to an IP network, the method comprising:

determining, by the node, whether a program specified by a user and associated with identification information associated with a communication subscription associated with the IoT device is present based on a session identifier included in a header of data, by referencing an association linking the session identifier to the identification information, the session identifier indicating a session on the U-plane;

when the program specified by the user and associated with the identification information is present, causing, by the node, the program specified by the user and associated with the identification information to process a payload of the data transmitted through the session; and transmitting, by the node to the IP network, data including a payload obtained by causing the program specified by the user and associated with the identification information to process the payload of the data transmitted through the session.

2. The method according to claim 1, wherein processing which is allowed to be executed by the program includes:

arithmetic processing using a computing resource of the node; and an API that is pre-authorized in association with the subscriber identification information.

3. The method according to claim 2, wherein the API that is pre-authorized includes an API that performs protocol conversion on a transport layer or an application layer of the data.

4. The method according to claim 2, wherein the API that is pre-authorized includes at least one of:

an API that changes a payload of the data, or a transmission destination of the data that has been modified, when a predetermined condition is satisfied;

an API that discards a payload of the data, or the data that has been modified, when a predetermined condition is satisfied; or an API that transmits, to the IoT device, the data for which a payload has been modified, when a predetermined condition is satisfied.

5. The method according to claim 2, wherein the data that is allowed to be input is restricted in the program.

6. The method according to claim 5, wherein the data that is allowed to be input includes data received from the IoT device, data associated with the identification information, and data associated with a session identified by the session identifier.

7. The method according to claim 6, wherein the data associated with the identification information includes at least one of:

information set in the IoT device; or information set for a group to which the identification information belongs.

8. The method according to claim 1, wherein the node has a first instance and a second instance on a public cloud, the first instance receives the data, and the second instance causes the program to process the data.

9. The method according to claim 8, wherein processing which is allowed to be executed by the program is restricted to a predetermined range of a computing resource of the second instance that is allowed to be used.

10. The method according to claim 1, wherein the first facility communicates with a base station.

11. The method according to claim 1, wherein the session identifier is a Tunneling Endpoint ID (TEID).

12. The method according to claim 1, wherein processing, which is allowed to be executed by the program, is restricted.

13. The method according to claim 1, further comprising receiving, by the node, the data from the IoT device.

14. The method according to claim 1, wherein the identification information is stored in a physical Subscriber Identity Module (SIM) card installed in the IoT device, is stored in a semiconductor chip embedded in the IoT device, or is included in software stored in the IoT device.

15. The method according to claim 1, wherein the data including the payload obtained by causing the program specified by the user and associated with the identification information to process the payload of the data transmitted through the session is transmitted from the core network to the IP network.

16. A non-transitory storage medium comprising one or more programs for causing a node constituting a core network to execute a method of data processing on data from an IoT device, the core network including a first facility and a second facility configured to be capable of receiving data from the IoT device through communication on a U-plane from the first facility and transmitting the data to an IP network, the method comprising:

determining, by the node, whether a program specified by a user and associated with identification information associated with a communication subscription associated with the IoT device is present based on a session identifier included in a header of data, by referencing an association linking the session identifier to the identification information, the session identifier indicating a session on the U-plane;

when the program specified by the user and associated with the identification information is present, causing, by the node, the program specified by the user and associated with the identification information to process a payload of the data transmitted through the session; and transmitting, by the node to the IP network, data including a payload obtained by causing the program specified by the user and associated with the identification information to process the payload of the data transmitted through the session.

17. A node constituting a core network, the core network including a first facility and a second facility configured to be capable of receiving data from an IoT device through communication on a U-plane from the first facility and transmitting the data to an IP network, wherein the node determines whether a program specified by a user and associated with identification information associated with a communication subscription associated with the IoT device is present based on a session identifier included in a header of data, by referencing an association linking the session identifier to the identification information, the session identifier indicating a session on the U-plane, when the program specified by the user and associated with the identification information is present, the node causes the program specified by the user and associated with the identification information to process a payload of the data transmitted through the session, and the node transmits, to the IP network, data including a payload obtained by causing the program specified by the user and associated with the identification information to process the payload of the data transmitted through the session.

* * * * *